H. TRIBLE & N. A. DAVIS.
Propelling-Device for Street-Cars and the Like.
No. 159,980.
Patented Feb. 16, 1875.
FIG. I.
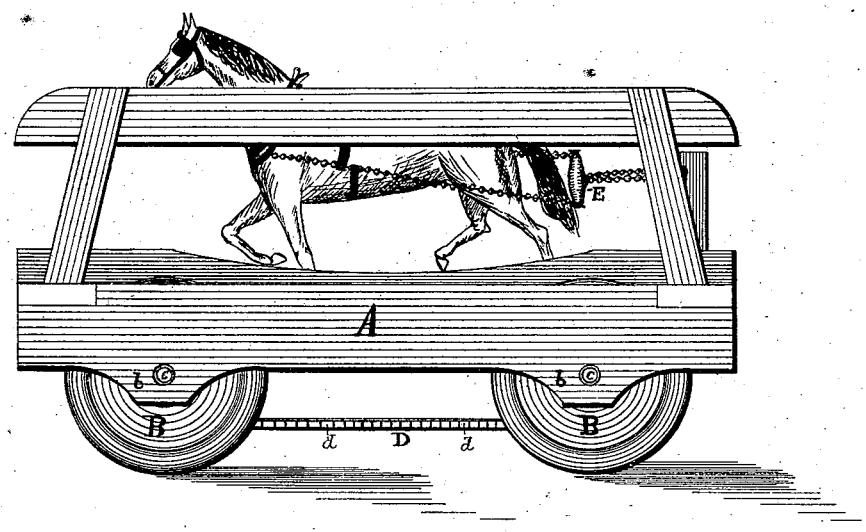
FIG. II.
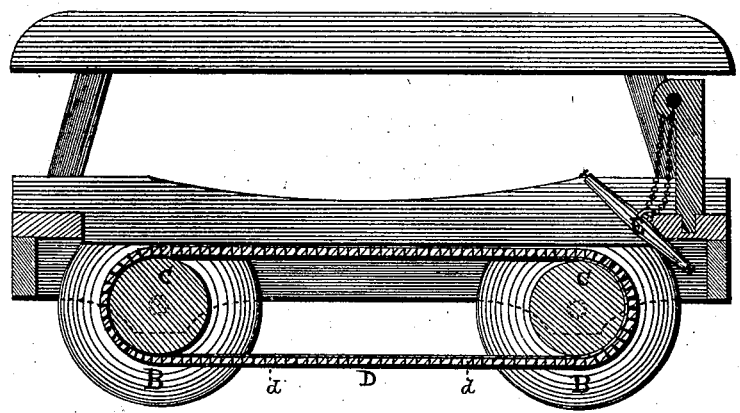
WITNESSES.
INVENTOR.

UNITED STATES PATENT OFFICE.

HERNDON TRIBLE AND NICHOLAS A. DAVIS, OF RUSK, TEXAS.

IMPROVEMENT IN PROPELLING DEVICES FOR STREET-CARS AND THE LIKE.

Specification forming part of Letters Patent No. 159,980, dated February 16, 1875; application filed July 10, 1874.

*To all whom it may concern:*

Be it known that we, HERNDON TRIBLE and NICHOLAS A. DAVIS, of Rusk, Cherokee county, Texas, have invented a new and useful Improvement in Railway-Cars, of which the following is a clear, full, and exact description, reference being had to the accompanying drawings, making a part of this specification, in which—

Figure 1 is a side elevation, and Fig. 2 is a longitudinal section of same.

Our invention relates to railway-cars where horse-power is applied; and it consists in the combination of devices hereinafter named.

That others may make and use our invention, we will proceed to describe the exact manner in which we have carried it out.

In the drawings, A represents a railway-truck; B B, the wheels, and *b b* bearings for the axles. The axles C C between the wheels form drums, over which passes the broad endless belt D, as shown in Fig. 2. Transverse the endless belt are suitable cross bars or slats *d*, against which the feet of a horse can press. E is a single-tree to which a horse is to be harnessed; and as he exerts power in pulling at the single-tree, it is evident that he will slide the endless belt which revolves the drums C C and the wheels B B, and cause the truck to move in a direction opposite to the draft.

To the truck may be attached as many other cars as the power applied may be able to move.

By this application of horse-power I avoid the necessity of ballasting or paving the track of a railway; and my car is enabled to move forward over trestle-work and open bridges, where the ordinary horse-cars cannot pass. There is also great economy in thus protecting the stock from the destructive effects of the pavements, and from exposure to the weather. It is evident, also, that the cars may be run on plain or plank roads by the same application of power.

We are aware that the application of horse-power to railway-cars by means of the endless belt is not new, as the same is shown in the patent to D. J. Tittle, June 23, 1868, No. 79,282. We therefore do not claim this application of horse-power, broadly.

Having thus described our invention, what we claim as new, and desire to secure by Letters Patent, is—

In combination with the truck A, having bearings *b*, the drums C C and slatted belt D, substantially as and for the purpose set forth.

HERNDON TRIBLE.
NICHOLAS A. DAVIS.

Witnesses:
JOHN B. FULLER,
HENRY GOON.